United States Patent
Sfar et al.

(10) Patent No.: US 11,466,669 B2
(45) Date of Patent: Oct. 11, 2022

(54) DRIVE TRAIN ARRANGEMENT

(71) Applicant: Renk Aktiengesellschaft, Augsburg (DE)

(72) Inventors: Mohamed Sfar, Hörstel (DE); Matthias Walkowiak, Recklinghausen (DE)

(73) Assignee: RENK AKTIENGESELLSCHAFT, Augsburg (DE)

( * ) Notice: Subject to any disclaimer, the term of this patent is extended or adjusted under 35 U.S.C. 154(b) by 0 days.

(21) Appl. No.: 16/923,391

(22) Filed: Jul. 8, 2020

(65) Prior Publication Data

US 2021/0017966 A1 Jan. 21, 2021

(30) Foreign Application Priority Data

Jul. 18, 2019 (DE) .................... 10 2019 119 473.3

(51) Int. Cl.
*F03D 80/80* (2016.01)
*F03D 9/25* (2016.01)
*F03D 15/00* (2016.01)

(52) U.S. Cl.
CPC ............... *F03D 80/88* (2016.05); *F03D 9/25* (2016.05); *F03D 15/00* (2016.05); *F05B 2240/60* (2013.01); *F05B 2260/40311* (2013.01); *F05B 2260/503* (2013.01); *F05B 2260/902* (2013.01)

(58) Field of Classification Search
CPC . F03D 80/88; F03D 9/25; F03D 15/00; F05B 2240/60; F05B 2260/40311; F05B 2260/503; F05B 2260/902
See application file for complete search history.

(56) References Cited

U.S. PATENT DOCUMENTS

| | | | | |
|---|---|---|---|---|
| 2002/0049108 A1* | 4/2002 | Hosle | ....................... | F03D 15/00 475/3 |
| 2011/0068583 A1* | 3/2011 | Burkart | ..................... | F03D 9/25 290/55 |
| 2012/0263594 A1* | 10/2012 | Winkelmann | .......... | F03D 80/70 416/174 |
| 2013/0090203 A1* | 4/2013 | Hehenberger | .......... | F03D 9/255 475/5 |
| 2014/0221144 A1* | 8/2014 | Vath | ........................ | F03D 80/70 475/151 |

FOREIGN PATENT DOCUMENTS

| | | |
|---|---|---|
| CN | 101375052 | 2/2009 |
| DE | 19917605 | 1/2001 |
| DE | 102007047317 | 4/2009 |
| DE | 112008000494 | 8/2010 |
| DE | 102011106535 | 1/2013 |
| DE | 202018100231 | 4/2019 |
| WO | WO 2009043330 | 4/2009 |
| WO | WO 2009049599 | 4/2009 |

* cited by examiner

*Primary Examiner* — Sean Gugger
(74) *Attorney, Agent, or Firm* — Cozen O'Connor

(57) ABSTRACT

A drive train arrangement preferentially for a wind power plant having a rotor shaft, a generator, and a gear, which is indirectly or directly connected to the rotor shaft and the generator. The gear is at least partly or completely integrated in the rotor shaft.

19 Claims, 1 Drawing Sheet

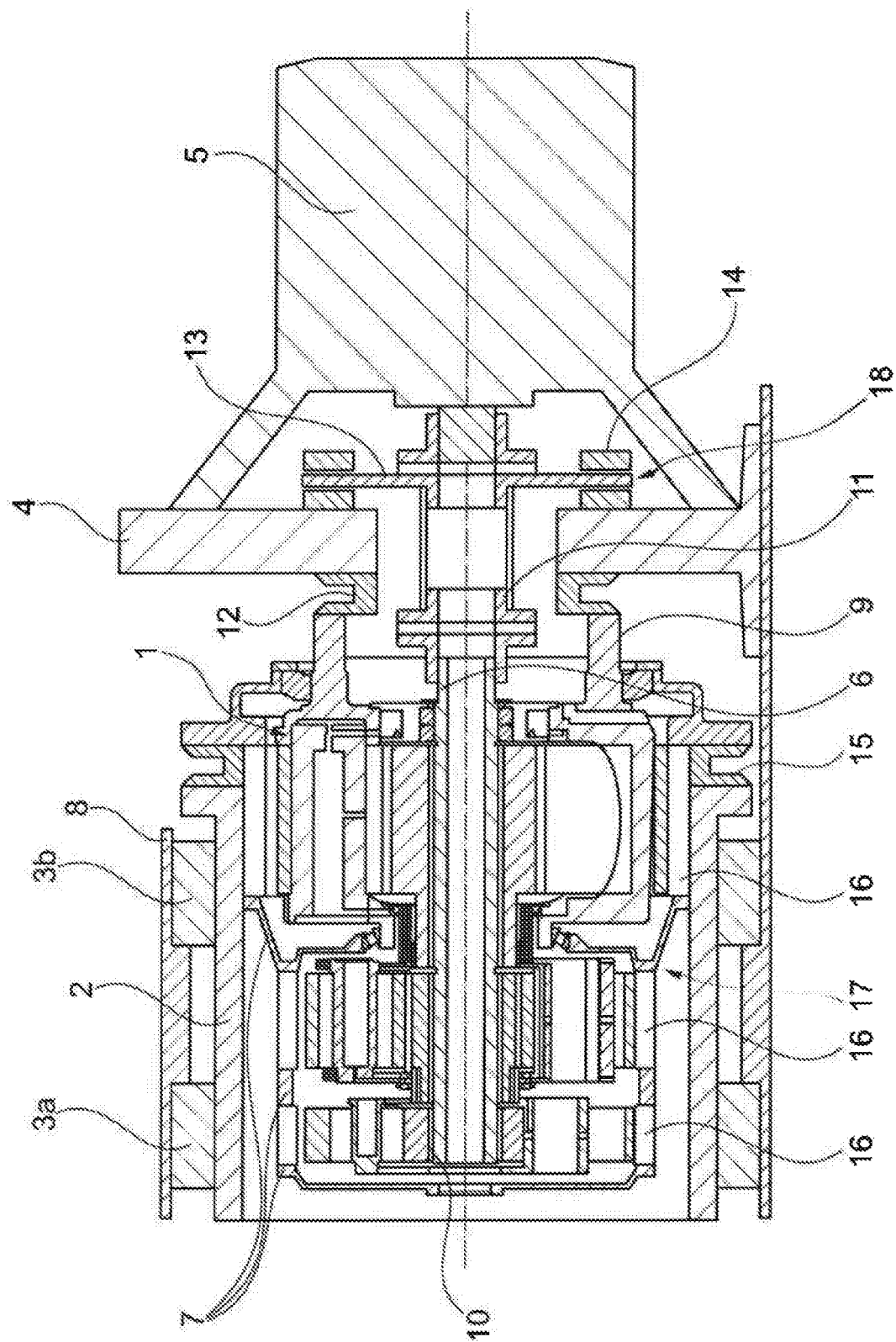

DRIVE TRAIN ARRANGEMENT

BACKGROUND OF INVENTION

1. Field of the Invention

The invention relates to a drive train arrangement, preferentially for a wind power plant, having a rotor shaft, a generator, and a gear indirectly or directly connected to the rotor shaft and the generator.

2. Description of Related Art

For generating electric energy, a generator in a wind power plant is usually arranged together with the rotor at an upper end of a tower. The rotary speed of the rotor is typically in a range between 0 and 12 revolutions per minute. Direct rotor generators suitable for such low rotary speeds have a very high weight. With high electric outputs in the megawatt range, this results in very heavy weights of rotor with machine nacelle. For this reason, a gear is normally connected between rotor and generator to make possible using fast-running generators that ensure a significant weight reduction.

DE 199 17 605 A1 is based on a shaft-mounted gear which, by way of a press fit, is connected to the rotor shaft of a wind turbine, with which the wind power is introduced into a gear. The wind turbine is a multi-stage planetary gear arrangement and a spur gear stage for the output into a generator. The power drive input into the planetary gear arrangement takes place via an internal gear that drives at least one planet gear, on the housing-fixed shaft of which in each case a further planet gear is arranged, which meshes with a sun gear from which the output into the spur gear stage takes place.

DE 20 2018 100 231 U1 discloses an arrangement in which the mounting of the frame gear simultaneously is also the mounting of the rotor with the rotor shaft. An additional bearing for the rotor with the rotor shaft is therefore no longer required as a result of which the head weight of a wind power plant with same electric output is further reduced.

DE 10 2011 106 535 A1 relates to a drive train of a turbo power plant, in particular of a wind power plant or a sea current power plant, which comprises a rotor hub that carries at least one rotor blade, and a gear comprising multiple planetary stages, which steps-up a rotary motion of a rotor shaft connected to the rotor, transmitting it to a drive of a downstream generator. There, the rotor hub, the gear, and the generator are arranged coaxially to one another. The publication furthermore discloses a drive train of a turbo power plant, in which in a compact manner a suitable stepping-up of a rotary motion of a rotor shaft is realisable via a gear, which is embodied as power-split gear having three planetary stages, to a drive of a downstream generator is realisable.

The above gear arrangements are complex constructions and are very long since all components are sequentially arranged behind one another. In addition to this, the assembly and disassembly and the maintenance of the relevant components is very involved.

SUMMARY OF THE INVENTION

An object of one aspect of the present invention is a drive train arrangement, preferentially for wind power plants, which with same system output further reduces the weight of rotor and machine nacelle, simplifies the assembly and configures the length more compact.

According to one aspect of the invention, a drive train arrangement preferentially for a wind power plant with a rotor shaft, a generator, and a gear that is indirectly or directly connected to the rotor shaft and the generator is proposed. There, the gear is at least partially or completely integrated in the rotor shaft. By way of this, the entire drive train is a more compact design and the overall weight of the components reduced.

In one aspect of the invention, seen in the axial direction of the rotor shaft, between the generator and the gear a machine support fixed in place is arranged, on which the generator is fixed directly on the one side and the gear indirectly or directly on the opposite side seen in the axial direction. Advantageous in this is that the machine support fixed in place supports the reaction moments of the gear and of the generator.

A decisive advantage of this drive train arrangement lies in its compact design with disassemblability of the individual components, generator and gear from the drive train at the same time, without a reinstallation of the rotor being required. A substantial part for achieving this is the machine support. By way of this, the drive train has a substantial advantage relative to fully integrated drive trains, in which for the disassembly of the gear initially the rotor of the wind power plant has to be disassembled.

Preferentially, the drive train arrangement is designed in such a manner that the gear is connected to the rotor shaft by a torsionally rigid coupling. Here, the compact design and a zero-backlash, angularly true gear of the torques because of a very high torsional rigidity is favourable.

In one aspect of the invention it is provided that the rotor shaft, by sliding bearings or rolling bearings attached on the outside, is mounted on a surrounding structure. In this way, weight forces and wind loads acting on the rotor shaft are supported on the surrounding structure.

Further, an embodiment is favourable in which the generator is connected to a driveshaft, which represents the output shaft of the gear. By way of this, the entire drive train can in turn be designed more compact and lighter in weight.

In a further advantageous version it is provided according to one aspect of the invention that the gear is designed as a planetary gear. The planetary gear is characterized by a high efficiency and makes possible, because of its compact design, a reduction of the structural length with high power density.

The drive train arrangement according to one aspect of the invention is designed in an embodiment version so that the gear comprises at least two planetary stages the internal gears of which are fixed to one another indirectly by housing components or directly and non-rotatably to one another, as a result of which a sequential housing group of at least the internal gears is formed. Because of multiple planetary stages or of the sequential housing group, the power density of the gear is further increased. Accordingly, all internal gears rotate with the drive rotation speed as a result of which a power branching over the individual planetary stages of the gear and the integration of the gear into the rotor shaft is made possible. Furthermore, the use in particular of an internal gear reduces both the volume and also the mass of the gear.

It should be noted that the internal gears and the housing group are connected to the rotor shaft and thus rotate with the rotational speed of the rotor.

It is further advantageous when the gear comprises a planet carrier, which is connected to the machine support by a torsionally rigid coupling. Here it is favourable that the support of the reaction moments of the gear on the machine support takes place by the planet carrier.

In an embodiment of the present drive train arrangement it is provided, furthermore, that the gear comprises a sun, which for driving the output shaft of the gear is coupled to the same. Advantageous in this is that the drive of the generator takes place via the sun of the fast-rotating planetary stage since in this planetary stage the power of a planetary gear is correspondingly summed up.

Preferentially, the drive train arrangement is arranged such that the output shaft of the gear is indirectly or directly connected to the generator by a flexible coupling. Here it is favourable that the flexible coupling transmits large torques with small size, absorbs shocks and vibrations, and dampens torque peaks.

In alternative embodiment of one aspect of the present invention it is provided that the flexible coupling or an intermediate shaft connected with the same projects through a central opening in the machine support and is connected to the generator.

In an advantageous embodiment it is provided that between the flexible coupling and the generator a braking device, preferentially designed with a brake disc and a brake, is arranged, wherein the braking device is directly connected to the machine support and indirectly or directly to the flexible coupling. By way of the braking device, an emergency shut-down or a manual stop for example during maintenance or repair of the wind power plant is made possible. A further advantage is the supporting of the reaction moments of the braking device on the machine support.

BRIEF DESCRIPTION OF THE DRAWINGS

Other advantageous further developments of the invention are characterized in the subclaims or presented in more detail in the following together with the description of the preferred embodiment of the invention by way of the figures. It shows:

The FIGURE is a sectional representation of a drive train arrangement.

DETAILED DESCRIPTION OF THE PRESENTLY PREFERRED EMBODIMENTS

In the FIGURE, a sectional representation of a drive train arrangement for a wind power plant having a rotor shaft 2, a generator 5, and a gear 1 is shown. The gear 1 is designed as a planetary gear. Furthermore, the rotor shaft 2 is mounted on a surrounding structure 8 of the wind power plant by two rolling bearings 3a, 3b arranged on the outer circumference and the planetary gear 1 is indirectly connected to the rotor shaft 2 by a torsionally rigid coupling 15. Optionally to the rolling bearings 3a, 3b, sliding bearings can also be employed. Here, the planetary gear 1 is partly integrated in the rotor shaft 2 and directly connected to the generator 5.

Viewed in the axial direction of the rotor shaft 2, the generator 5 is arranged spaced apart from an end piece of the rotor shaft 2 and the planetary gear 1. In the axial direction, a machine support 4 is fixed in place and is arranged between the generator 5 and the planetary gear 1. The machine support 4 is fixed on the surrounding structure 8 of the wind power plant. The machine support 4 with a central passage opening in the axial direction extends in a radial direction running orthogonally to the axial direction of the rotor shaft 2.

Furthermore, the generator 5 is fixed on the machine support 4 directly on the side spaced apart from the rotor shaft 2 and the gear 1 indirectly on the side located diametrically opposite. Here, the planetary gear 1 comprises a planet carrier 9 which, by means of a torsionally rigid coupling 12, is connected to the machine support 4.

The planetary gear 1 comprises a sun 10 which, for driving the output shaft 6 of the gear 1, is coupled to the same. Furthermore, the generator 5 is coupled to a driveshaft, which represents the output shaft 6 of the planetary gear 1. This output shaft 6 in turn is indirectly connected to the generator 5 by a flexible coupling 11. A generator shaft lies on the same axis of rotation as the output shaft 6 and the rotor shaft 2. The central passage opening of the machine support 4 is arranged in the region of this axis of rotation and formed in such a manner that an intermediate shaft connected to the flexible coupling 11 projects through the passage opening and is coupled to the generator 5.

In addition to this, the FIGURE shows that the planetary gear 1 comprises three planetary stages the internal gears 16 of which are indirectly non-rotatably fixed to one another by housing components 7, as a result of which a sequential housing group 17 is formed.

Apart from this, a braking device 18 with a brake disc 13 and a brake 14 is arranged between the flexible coupling 11 and the generator 5. The shown brake 14 is directly connected to the machine support 4 and the brake disc 13 is coupled to the intermediate shaft.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drive train arrangement comprising:
a rotor shaft;
a generator; and
a gear that is indirectly or directly connected to the rotor shaft and the generator,
wherein the gear is at least partly or completely integrated in the rotor shaft,
the gear comprises a planet carrier directly connected to a fixed machine support by a torsionally rigid coupling,
wherein the torsionally rigid coupling is arranged axially between the planet carrier and the machine support, the machine support being fixed to a surrounding structure,
wherein the torsionally rigid coupling creates an axial spacing between the planet carrier and the machine support,
wherein the fixed machine support, which is fixed in place, is arranged between the generator and the gear as seen in an axial direction of the rotor shaft, and on which the generator is fixed directly on a one side and the gear indirectly or directly on a side located diametrically opposite.

2. The drive train arrangement according to claim 1, wherein the gear is connected to the rotor shaft by a torsionally rigid coupling.

3. The drive train arrangement according to claim 1, wherein the rotor shaft is mounted on the surrounding structure by sliding bearings or rolling bearings mounted on an outside of the rotor shaft.

4. The drive train arrangement according to claim 1, wherein the generator is connected to a driveshaft configured as an output shaft of the gear.

5. The drive train arrangement according to claim 1, wherein the gear is configured as a planetary gear.

6. The drive train arrangement according to claim 5, wherein the gear comprises:
   at least two planetary stages, internal gears of the at least two planetary stages are fixed to one another indirectly through housing components or directly and non-rotatably, as a result of which a sequential housing group of at least the internal gears is formed.

7. The drive train arrangement according to claim 6, wherein the gear further comprises a sun, which for driving an output shaft of the gear, is coupled to the output shaft.

8. The drive train arrangement according to claim 4, wherein the output shaft of the gear is indirectly or directly connected to the generator by a flexible coupling.

9. The drive train arrangement according to claim 8, wherein one of the flexible coupling or an intermediate shaft connected with the flexible coupling projects through a central opening in a machine support and is connected to the generator.

10. The drive train arrangement according to claim 8, further comprising:
    a braking device arranged between the flexible coupling and the generator.

11. The drive train arrangement according to claim 10, wherein the braking device comprises:
    a brake disc; and
    a brake.

12. The drive train arrangement according to claim 11 wherein the braking device is directly connected to a machine support and indirectly or directly to the flexible coupling.

13. The drive train arrangement according to claim 9, further comprising:
    a braking device arranged between the flexible coupling and the generator.

14. The drive train arrangement according to claim 13, wherein the braking device comprises:
    a brake disc; and
    a brake.

15. The drive train arrangement according to claim 14 wherein the braking device is directly connected to the machine support and indirectly or directly to the flexible coupling.

16. The drive train arrangement according to claim 1, wherein the drive train arrangement is for a wind power plant.

17. The drive train arrangement according to claim 3, wherein the surrounding structure is nonrotatably attached to the fixed machine support.

18. The drive train arrangement according to claim 1, wherein the generator is directly connected to the machine support.

19. The drive train arrangement according to claim 1, wherein the torsionally rigid coupling is arranged axially adjacent the rotor shaft.

* * * * *

UNITED STATES PATENT AND TRADEMARK OFFICE
CERTIFICATE OF CORRECTION

| | | |
|---|---|---|
| PATENT NO. | : 11,466,669 B2 | |
| APPLICATION NO. | : 16/923391 | |
| DATED | : October 11, 2022 | |
| INVENTOR(S) | : Mohamed Sfar et al. | |

It is certified that error appears in the above-identified patent and that said Letters Patent is hereby corrected as shown below:

On the Title Page

Item (73) should read:
RENK GMBH AUGSBURG, GERMANY

Signed and Sealed this
Twenty-seventh Day of December, 2022

*Katherine Kelly Vidal*

Katherine Kelly Vidal
*Director of the United States Patent and Trademark Office*